(12) United States Patent
Nakai (10) Patent No.: US 10,313,777 B2
(45) Date of Patent: Jun. 4, 2019

(54) EARPHONE CONTROL CIRCUIT AND METHOD, EARPHONE, AS WELL AS AUDIO OUTPUT DEVICE AND METHOD

(71) Applicant: Boe Technology Group Co., Ltd., Beijing (CN)

(72) Inventor: Tadashi Nakai, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/522,846

(22) PCT Filed: Oct. 12, 2016

(86) PCT No.: PCT/CN2016/101864
§ 371 (c)(1),
(2) Date: Nov. 16, 2017

(87) PCT Pub. No.: WO2017/067410
PCT Pub. Date: Apr. 27, 2017

(65) Prior Publication Data
US 2018/0132028 A1    May 10, 2018

(30) Foreign Application Priority Data

Oct. 19, 2015   (CN) .......................... 2015 1 0674928

(51) Int. Cl.
*H04R 1/10* (2006.01)
*H04M 9/08* (2006.01)
*H04R 5/033* (2006.01)

(52) U.S. Cl.
CPC ............ *H04R 1/1041* (2013.01); *H04M 9/08* (2013.01); *H04R 1/1033* (2013.01); *H04R 5/033* (2013.01); *H04R 2420/09* (2013.01)

(58) Field of Classification Search
CPC .... H04R 1/1041; H04R 1/1033; H04R 5/033; H04R 2420/09; H04M 9/08
See application file for complete search history.

(56) References Cited

U.S. PATENT DOCUMENTS

2007/0076897 A1\* 4/2007 Philipp ................ H04R 1/1041
                                                                      381/74
2014/0086438 A1\* 3/2014 Tachibana ............ H04R 1/1041
                                                                     381/309

(Continued)

FOREIGN PATENT DOCUMENTS

CN           101951534 A        1/2011
CN           104484150 A        4/2015

(Continued)

OTHER PUBLICATIONS

International Search Report and Written Opinion for PCT Application No. PCT/CN2016/101864 dated Jan. 10, 2017.

(Continued)

*Primary Examiner* — Jason R Kurr
(74) *Attorney, Agent, or Firm* — Calfee, Halter & Griswold LLP (57) ABSTRACT

An earphone control circuit and method, an earphone, as well as an audio output device and method are provided. The earphone control circuit includes a detecting module for detecting whether an earphone is in a wearing state and outputting a detection signal indicating that the earphone is in a wearing state or in a non-wearing state. The earphone control circuit further includes a determining module for outputting a first control signal indicating that the earphone is in a wearing state or outputting a second control signal indicating that the earphone is in a non-wearing state according to the detection signal.

16 Claims, 4 Drawing Sheets

(56) References Cited

U.S. PATENT DOCUMENTS

| | | | |
|---|---|---|---|
| 2014/0314247 A1* | 10/2014 | Zhang | H04R 1/1041 |
| | | | 381/74 |
| 2015/0063587 A1 | 3/2015 | Park et al. | |
| 2015/0078573 A1* | 3/2015 | Nicholson | H04R 1/1041 |
| | | | 381/74 |
| 2015/0304757 A1* | 10/2015 | Kim | H04R 1/1041 |
| | | | 381/74 |
| 2017/0013345 A1* | 1/2017 | Kumar | G10K 11/1788 |

FOREIGN PATENT DOCUMENTS

| | | |
|---|---|---|
| CN | 105338447 A | 2/2016 |
| CN | 205071294 U | 3/2016 |
| JP | 2014003501 A | 1/2014 |

OTHER PUBLICATIONS

First Office Action for Chinese Patent Application No. 201510674928.2 dated Dec. 4, 2017.
Second Office Action for Chinese Patent Application No. 201510674928.2 dated Jul. 4, 2018.

* cited by examiner

EARPHONE CONTROL CIRCUIT AND METHOD, EARPHONE, AS WELL AS AUDIO OUTPUT DEVICE AND METHOD

The present application is the U.S. national phase entry of PCT/CN2016/101864, with an international filing date of Oct. 12, 2016, which claims the benefit of Chinese Patent Application No. 201510674928.2, filed on Oct. 19, 2015, the entire disclosure of which is incorporated herein by reference.

TECHNICAL FIELD

The present application relates to the technical field of electronic devices, in particular to an earphone control circuit, an earphone, an audio output device, a display device, an earphone control method, and a method for switching between output modes of audio signals.

BACKGROUND

Electronic devices like televisions, laptop computers, tablet computers and portable mobile devices usually have earphone jacks. By detecting plug states of an earphone jack, it can be determined whether an earphone has been plugged into the earphone jack. When an earphone is plugged into the earphone jack, the electronic device will output audio signals through the earphone. On the contrary, when no earphone is plugged into the earphone jack, the electronic device outputs audio signals through a speaker carried on itself.

As electronic devices are becoming thinner and thinner, and the earphone jacks are usually arranged on a side of the electronic devices, higher requirements are placed on designs of earphones. In addition, each time a user switches between the earphone and the speaker, an operation of plugging the earphone into or unplugging the earphone from the earphone jack needs to be performed. So, it is quite inconvenient.

SUMMARY

In order to solve the above technical problems, the present application proposes an earphone control circuit, an earphone including the earphone control circuit, an audio output device having the earphone mounted thereon, a display device comprising the audio output device, an earphone control method, and a method for switching between output modes of audio signals.

The present application proposes an earphone control circuit. The earphone control circuit includes a detecting module for detecting a wearing state of an earphone and outputting a detection signal indicating an earphone state; and a determining module for determining, according to the detection signal from the detecting module, whether the earphone is in a wearing state and outputting a control signal indicating whether the earphone is in a wearing state.

According to one embodiment, the detecting module has a tri-axial acceleration sensor.

According to one embodiment, the detecting module includes a temperature sensor or a pressure sensor.

According to one embodiment, the determining module includes an AD converter for converting the detection signal received from the detecting module into a digital signal.

According to one embodiment, the determining module has a control signal output unit for outputting a control signal indicating whether the earphone is in a wearing state.

According to one embodiment, the earphone control circuit further includes a switch module for turning on/off the earphone control circuit. When the earphone control circuit is turned on, the determining module outputs a control signal indicating whether the earphone is in a wearing state. When the earphone control circuit is turned off, the determining module always outputs a control signal indicating that the earphone is in a wearing state.

The present application provides an earphone. The earphone has an input module for receiving signals input from the outside; an output module for outputting audio signals; and the earphone control circuit as described in any one of the above embodiments.

The present application provides an audio output device having the above-mentioned earphone mounted thereon. The audio output device includes a power supply module; a control module for outputting a switching signal according to the control signal from the earphone; an output module for switching between a first audio output mode and a second audio output mode according to the switching signal output from the control module.

According to one embodiment, the first audio output mode is outputting audio signals through a speaker, and the second audio output mode is outputting audio signals through an earphone.

According to one embodiment, the control module includes a switch circuit for outputting a switching signal instructing to output audio signals through a speaker when the control signal from the earphone indicates the first audio output mode, and for outputting a switching signal instructing to output audio signals through an earphone when the control signal from the earphone indicates the second audio output mode.

The present application further provides a display device having the above-mentioned audio output device.

Alternatively, the display device further includes an earphone connected to the audio output device in a detachable manner, wherein the earphone comprises the previously described earphone.

The present application further provides an earphone control method, which includes detecting a wearing state of the earphone; outputting a detection signal indicating an earphone state; determining whether the earphone is in a wearing state based on the detection signal; and outputting a control signal indicating whether the earphone is in a wearing state, so that the audio output device receiving the control signal switches audio output modes according to the control signal.

The present application further provides a method for switching between output modes of audio signals, which includes receiving a control signal sent by an earphone indicating whether the earphone is in a wearing state; and switching between audio output modes according to the control signal.

Alternatively, switching between audio output modes according to the control signal specifically includes when the control signal is a control signal indicating that the earphone is in a non-wearing state, determining the current audio output mode to be a first audio output mode in which audio signals are output through a speaker; and when the control signal is a control signal indicating that the earphone is in a wearing state, determining the current audio output mode to be a second audio output mode in which audio signals are output through an earphone.

The earphone according to the present application can realize switching between the audio output through an earphone and through an speaker of the audio output device with the earphone plugged into the audio output device all the time. However, it does not require operations such as plugging and unplugging of the earphone to realize switching between the two output modes, as that in the conventional earphone. Thus, operations such as repeated plugging and unplugging of the earphone can be avoided. In this way, problems concerning the difficulty in plugging an earphone into a thin electronic device are solved. The present application controls output to the earphone and the speaker from the audio output device by detecting whether the earphone is in a wearing state, thus making user operations more convenient.

BRIEF DESCRIPTION OF THE DRAWINGS

The above and other aspects, characteristics and advantages will be more readily understood by the following detailed description in conjunction with the accompanying drawings. In the drawings.

DETAILED DESCRIPTION OF THE EMBODIMENTS

Technical solutions in each embodiment of the present application will be now described clearly and completely with reference to the drawings. But obviously, the described embodiments are only some, instead of all, of the embodiments of the present application. All other embodiments that can be obtained by those ordinarily skilled in the art on the basis of the embodiments in the present application without using any inventive effort shall fall into the protection scope of the present application.

Figure 1:
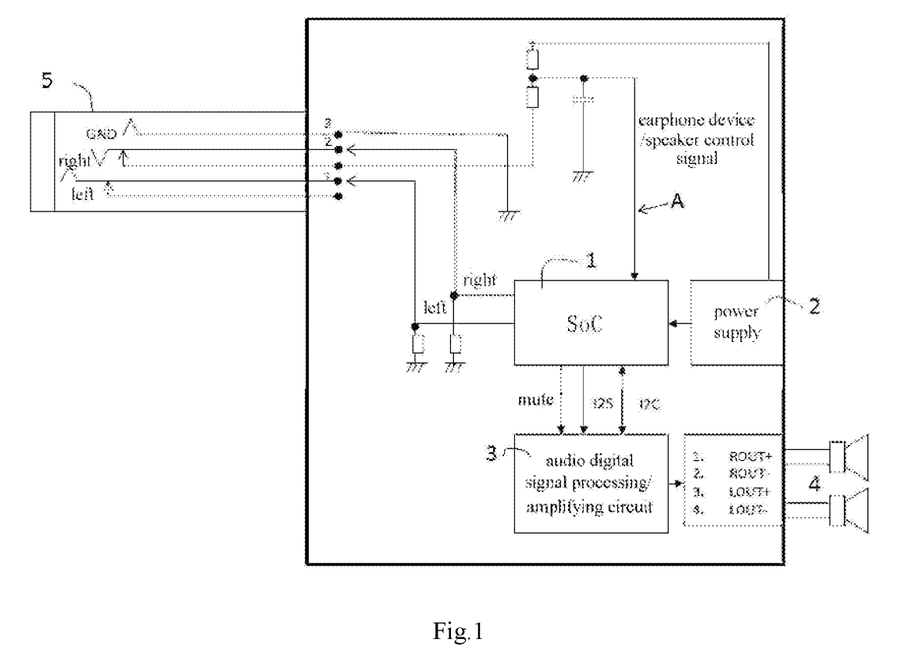
FIG. 1 is a schematic drawing of an audio output device having an earphone jack.

FIG. 1 is a structural diagram of an audio output device having an earphone jack according to one embodiment of the present application.

As shown in FIG. 1, the audio output device comprises an earphone jack 5, a system on chip (SoC) circuit 1, a power supply circuit 2, an audio digital signal processing/amplifying circuit 3 and a speaker circuit 4.

The audio output device detects whether plugging or unplugging of an earphone occurs in the earphone jack 5. When an earphone is plugged into the earphone jack 5, the SoC circuit can receive a detection signal from the earphone jack 5 indicating plugging of the earphone (e.g. the earphone/speaker control signal has a high level), and can output the audio signal to the earphone jack 5 while stopping output of audio signals through the speaker circuit 4. When the earphone is unplugged from the earphone jack 5, the SoC circuit can receive a detection signal from the earphone jack 5 indicating unplugging of the earphone (e.g. the earphone/speaker control signal has a low level). Besides, the SoC circuit 1 outputs audio signals to the speaker circuit 4 through the audio digital signal processing/amplifying circuit 3, while stopping output of audio signals through the earphone jack 5.

Each time a user uses an earphone on a conventional audio output device, a plugging operation needs to be performed. And if the earphone is no longer needed, an unplugging operation needs to be performed. So it is less convenient in operation. Moreover, as thin electronic devices have been more widely used, earphone jacks of audio output devices have become smaller and smaller. Besides, the earphones and the earphone jacks fit more tightly. This makes it more and more difficult to plug the earphones into the earphone jacks and further impair the operation convenience.

The embodiment of the present application provides a technical solution to the above-mentioned technical problem.

Figure 2:
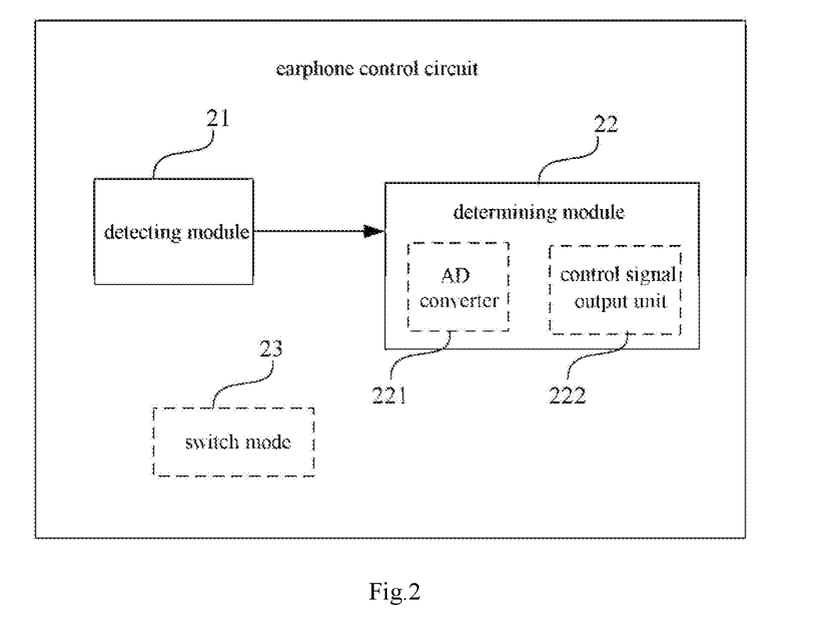
FIG. 2 is a schematic block diagram of an earphone control circuit according to at least one embodiment of the present application.

FIG. 2 is a schematic block diagram of an earphone control circuit according to the present application. The earphone control circuit comprises: a detecting module 21 disposed on a shell of the earphone or on a wiring near the shell, for detecting a wearing state of the earphone and outputting a detection signal indicating the wearing state of the earphone; a determining module 22 for determining, according to the detection signal from the detecting module 21, whether the earphone is currently in a wearing state, and outputting a control signal indicating the earphone in a wearing state or in a non-wearing state. In an embodiment of the present application, it is assumed that a first control signal is output when the earphone is determined to be in a wearing state. On the other hand, it is assumed that a second control signal is output when the earphone is determined to be in a non-wearing state. The SoC circuit can receive the first control signal and the second control signal, and control to output audio signals through the earphone or the speaker according to the first control signal and the second control signal.

In some embodiments, the detecting module 21 includes one or more sensors, each for sensing data related to the wearing state of the earphone. When it is necessary to detect the wearing state of the earphone, at least one of the sensors is enabled. By means of data sensed by the sensor, it can be determined whether the earphone is in a wearing state. Specifically, the sensors can be tri-axial acceleration sensors. Alternatively, they can be temperature sensors, pressure sensors, and the like.

In the above embodiment, when the detecting module 21 includes a tri-axial acceleration sensor, the tri-axial acceleration sensor may be of a piezo-resistive type, a piezoelectric type, a capacitive type, etc. The acceleration generated by the tri-axial acceleration sensor can be proportional to changes of resistance, voltage and capacitance, respectively, and can be collected by a corresponding amplifying and filtering circuit. Acceleration is a spatial vector. So, by means of the tri-axial acceleration sensor, components on three coordinate axes can be measured, so as to accurately learn the motion state of the earphone on the one hand. On the other hand, only by using the tri-axial acceleration sensor for sensing the acceleration signal, can it be possible to sense in a situation where the moving direction of the earphone is not known in advance. By detecting components on the three coordinate axes of X, Y and Z, the tri-axial acceleration sensor can accurately sense the movement of the earphone with the head of the user. Thus, it can obtain data related to the wearing state of the earphone. The tri-axial acceleration sensor has such characteristics as small volume and light weight, and it can measure spatial acceleration. So it can comprehensively and accurately reflect the motion properties of an object.

For example, when the tri-axial acceleration sensor senses that the earphone is moving or continuously moves for a period of time, it can be determined that the earphone is in a wearing state. Alternatively, when the earphone is in a stationary state or is in a stationary state for a period of time, it can be determined that the earphone is in a non-wearing state. In some embodiments, the wearing state of an earphone can also be detected by a temperature sensor. For example, when the earphone is in a wearing state, the shell of the earphone is close to the human face or is plugged into the ear canal. When the earphone is in a non-wearing state, the shell of the earphone is far from the human face and is not in contact with the human body. In one of the embodiments, the temperature around the earphone can be sensed by a temperature sensor on the shell of the earphone. When the temperature is close to the temperature of the human face, it is determined that the earphone is in a wearing state. Otherwise, the earphone is in a non-wearing state. The temperature sensor can also be arranged at a position contacting the ear canal or the human face, so that the result of sensing can be more accurate.

In other embodiments, a pressure sensor can also be used to detect the wearing state of an earphone. For example, when wearing a headset, certain pressure needs to be applied on the shell so that it can remain on the head of the user. So a pressure sensor arranged on the shell can be used to sense data related to the wearing state of the headset.

Of course, different types of sensors may be configured at the same time on the detecting module 21. Besides, a switching device can be configured to enable a certain sensor at a certain time to detect whether the earphone is in a wearing state. In order to avoid mis-operation, two or more sensors may be enabled at the same time to determine the wearing state of the earphone comprehensively.

Referring to FIG. 2, the determining module 22 may comprise an AD converter 221 for converting a detection signal received from the detecting module 21 into a digital signal. The determining module 22 may further comprise a control signal output unit 222 for outputting a control signal indicating that the earphone is in a wearing state or a non-wearing state according to the detection signal.

When the detecting module 21 includes a tri-axial acceleration sensor, for example, the determining module 22 can use the AD converter 221 to convert components on the three coordinate axes X, Y and Z from the tri-axial acceleration sensor into digital signals, and compare the converted digital signals to preset data corresponding to the motion states. If the comparison result shows a match, it means that when the data sensed by the tri-axial acceleration sensor indicate that the earphone is in a wearing state, the control signal output unit 222 can output a control signal indicating the earphone in a wearing state. If the comparison result shows a mis-match, it means that when the data sensed by the tri-axial acceleration sensor indicate that the earphone is in a non-wearing state, the control signal output unit 222 can output a control signal indicating the earphone in a non-wearing state. The earphone control circuit may further comprise a switch module 23 for turning on/off the earphone control circuit. When the earphone control circuit is turned on, the determining module 22 outputs a control signal indicating whether the earphone is in a wearing state. When the earphone control circuit is turned off, the determining module 22 always outputs a control signal indicating the earphone in a wearing state. When the user wears an earphone while lying, the detecting module 21 may not be able to detect whether the earphone is in a wearing state or not. In this case, the switch module 23 in the earphone control circuit is set into an off state, so that the earphone according to the present application can be used as an ordinary earphone.

When using the earphone of the present application, the actual wearing state of the earphone is detected, and a control signal is issued if the earphone is in a wearing state, so as to inform the audio output device connected to the earphone to output audio signals through this earphone. In addition, when the earphone is not in a wearing state, still audio signals will be output through a speaker of the audio output device without the need to unplug the earphone from the audio output device. The earphone according to the present application differs from any existing ones in that switching between output modes in response to operations such as plugging and unplugging of the earphone is replaced with switching between output modes in response to a determination of the actual wearing state of the earphone. Thus, repeated plugging and unplugging of the earphone can be avoided.

Figure 3:
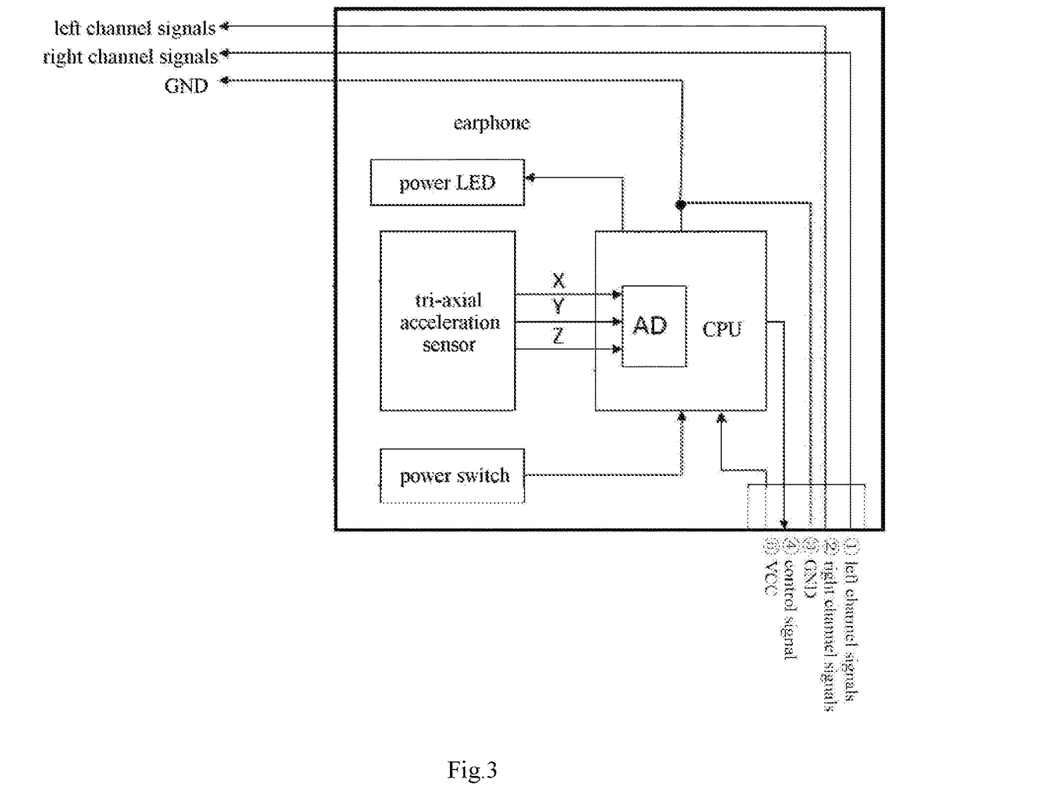
FIG. 3 is a structural diagram of an earphone according to at least one embodiment of the present application.

FIG. 3 is a schematic drawing of an earphone according to the present application. The earphone may comprise an input module for receiving signals input through the audio output device; an output module for outputting audio signals; and an earphone control circuit according to the present application.

The earphone may comprise an earphone plug for plugging into an earphone jack of the audio output device as an input module. It can receive audio signals of left and right channels (i.e. Left signals and Right signals) from the audio output device, GND signals as well as power signals (VCC). In addition, the earphone plug can also transmit, to the audio output device, control signals output from the control signal output unit of the determining module in the earphone control circuit, such as first control signals and second control signals.

As shown in FIG. 3, the detecting module of the earphone control circuit may comprise a tri-axial acceleration sensor. The determining module may comprise an AD converter. The switching module may comprise a power switch and a power LED. When the power switch turns on the earphone control circuit, the power LED lights up, and the determining module outputs a control signal indicating whether the earphone is in a wearing state. When the power switch turns off the earphone control circuit, the power LED goes out, and the determining module always outputs a control signal indicating that the earphone is in a wearing state.

Figure 4:
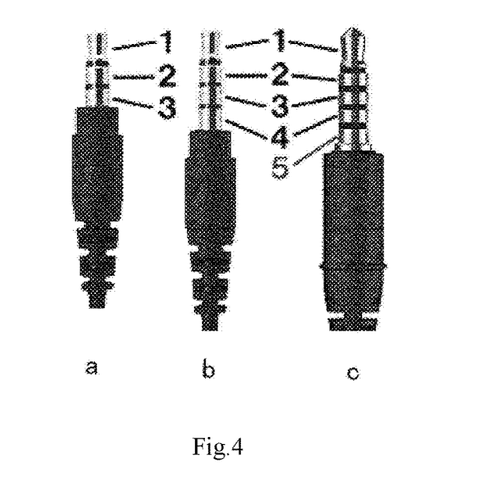
FIG. 4 is a structural diagram of an earphone plug provided in at least one embodiment of the present application.

The mainstream earphone plug in the existing products is of a three-pole type, as shown by earphone a in FIG. 4. In this figure, contact ① (numeral 1 in the figure) is connected to left channel audio signals, contact ② (numeral 2 in the figure) is connected to right channel audio signals, and contact ③ (numeral 3 in the figure) is connected to GND signals. The earphone plug can also be of a four-pole type with MIC, as shown by earphone b in FIG. 4. The four-pole type of earphone plugs can be divided into two kinds, one is Cellular Telephone Industry Association (CTIA), wherein contact ① is connected to left channel audio signals, contact ② is connected to right channel audio signals, contact ③ is connected to GND signals, and contact ④ (numeral 4 in the figure) is connected to MIC. The other kind is Open Mobile Terminal Platform (OMTP), wherein contact ① is connected to left channel audio signals, contact ② is connected to right channel audio signals, contact ③ is connected to MIC, and contact ④ is connected to GND signals.

Since a control signal indicating the wearing state of the earphone needs to be output, the earphone plug of the earphone according to the present application may be of a five-pole type, as shown by earphone c in FIG. 4, wherein each contact corresponding to one of the five pole types. In this figure, contact ① is connected to left channel audio signals (Left signals), contact ② is connected to right channel audio signals (Right signals), contact ③ is connected to GND signals, contact ④ outputs a control signal (Control signal), and contact ⑤ (numeral 5 in the figure) is connected to power signals (Vcc). Wirings in the above-mentioned three-pole type, four-pole type and five-pole type of earphone plugs are as shown in table 1.

TABLE 1

Wirings in the three-pole type, four-pole type and five-pole type of earphone plugs

| | 3-pole | 4-pole CTIA | 4-pole OMTP | 5-pole |
|---|---|---|---|---|
| 1 | L | L | L | L |
| 2 | R | R | R | R |
| 3 | GND | GND | MIC | GND |
| 4 | — | MIC | GND | Control signal |
| 5 | — | — | — | VCC |
| Used or not | ○ | ○ | X | ○ |

It can be seen from table 1 that the earphone according to the present application is compatible with the existing 3-pole type and 4-pole CTIA type of earphone plugs. However, when an existing earphone plug is used, the control signal indicating the wearing state of the earphone cannot be output. So they can only be used as common earphones.

Figure 5:
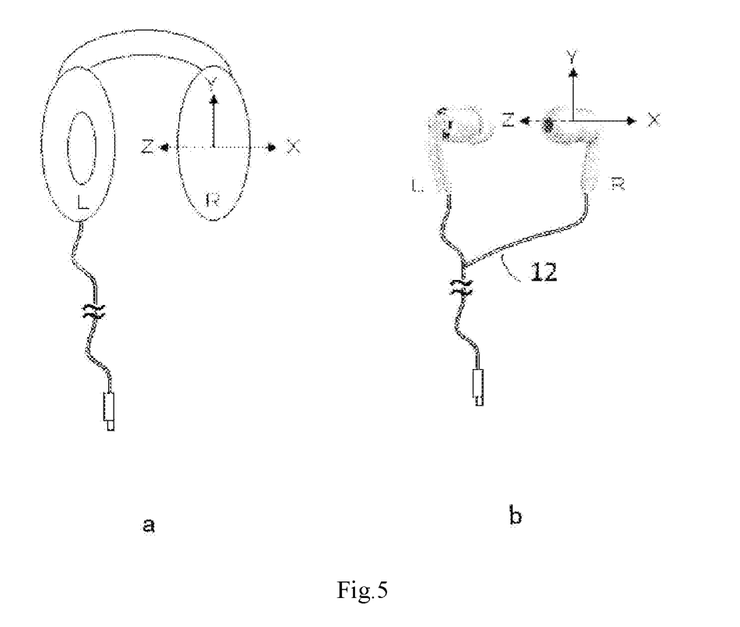
FIG. 5 is a structural diagram of different types of earphone provided in at least one embodiment of the present application.

The earphone provided by embodiments of the present application can be a headset a as shown in FIG. 5 or an earbud b as shown in FIG. 5.

Figure 6:
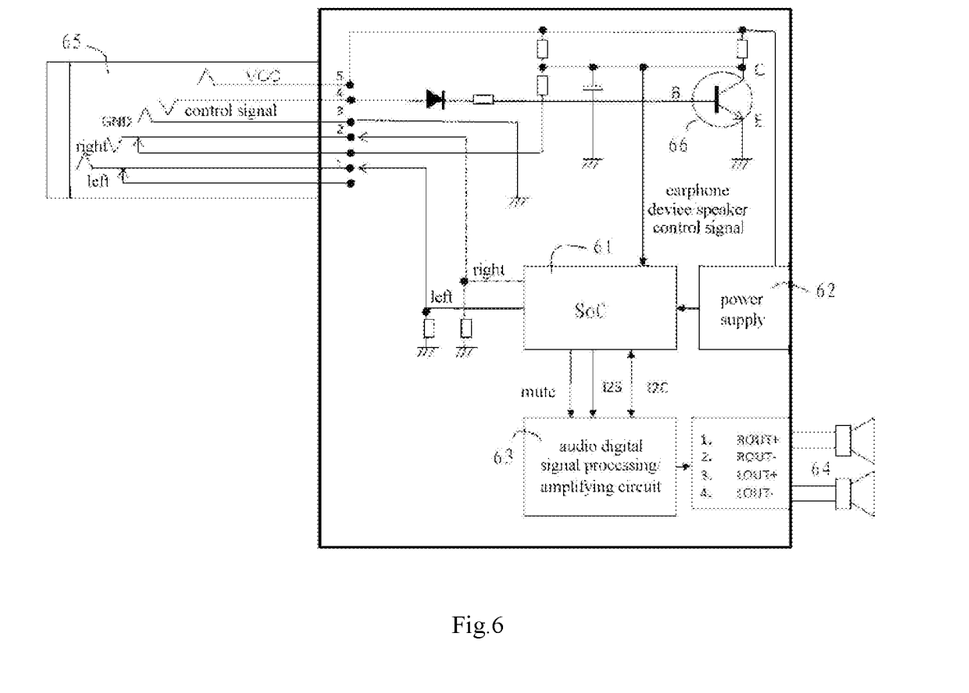
FIG. 6 is a schematic drawing of an audio output device according to at least one embodiment of the present application.

FIG. 6 is a schematic drawing of an audio output device according to the present application. The audio output device according to the present application comprises a 5-pole type of earphone jack, a SoC, a power supply, an audio digital signal processing/amplifying circuit, a speaker and a switch circuit.

As shown in FIG. 6, the audio output device according to the present application comprises an earphone jack 65 corresponding to the earphone plug, a SoC circuit 61, a power supply circuit 62, an audio digital signal processing/amplifying circuit 63, a speaker circuit 64 and a switch circuit 66. The audio output device not only detects whether plugging and unplugging of an earphone occurs in the earphone jack 65, but also receives a control signal from the earphone. When an earphone according to the present application is plugged into the earphone jack 65, the audio output device receives a control signal from the earphone and generates an earphone/speaker control signal according to the control signal indicating whether the earphone is in a wearing state. When the control signal from the earphone indicates that the earphone is in a wearing state, the switch circuit 66 is turned on, and the generated earphone/speaker control signal instructs the earphone to output audio signals. In this case, the SoC circuit 61 of the audio output device outputs audio signals to the earphone jack 65 while stopping output of audio signals through the speaker circuit 64. When the control signal from the earphone indicates that the earphone is not in a wearing state, the switch circuit is turned off, and the generated earphone/speaker control signal instructs the speaker to output audio signals. In this case, the SoC circuit 61 of the audio output device outputs audio signals to the speaker circuit 64 through the audio digital signal processing/amplifying circuit 63 while stopping output of audio signals through the earphone jack 65.

When using the earphone of the present application, the actual wearing state of the earphone is detected, and a control signal is issued if the earphone is in a wearing state, so as to inform the audio output device connected to the earphone to output audio signals through the earphone. In addition, when the earphone is not in a wearing state, still audio signals will be output through the speaker of the audio output device without the need to unplug the earphone from the audio output device. In the audio output device according to the present application, switching between output modes in response to operations such as plugging and unplugging of the earphone is replaced with between output modes in response to a control signal indicating the actual wearing state of the earphone. Thus, repeated plugging and unplugging of the earphone can be avoided. As a result, problems concerning the difficulty in plugging an earphone into a thin electronic device are solved, and user operations become more convenient.

Moreover, when the SoC circuit 61 of the audio output device outputs a Mute signal, output of audio signals from both the earphone and the speaker will be stopped.

Figure 7:
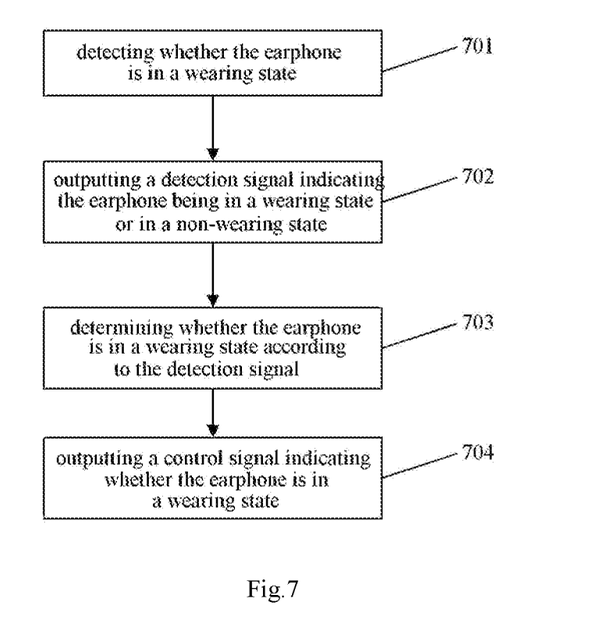
FIG. 7 is a flow chart of an earphone control method according to at least one embodiment of the present application.

FIG. 7 is a flow chart of an earphone control method according to the present application. As shown in FIG. 7, the earphone control method comprises: step 701: detecting whether the earphone is in a wearing state, specifically, detecting whether the earphone is in a wearing state or in a non-wearing state; step 702: outputting a detection signal indicating the earphone being in a wearing state or in a non-wearing state; step 703: determining whether the earphone is in a wearing state according to the detection signal; and step 704: outputting a control signal indicating whether the earphone is in a wearing state.

In step 701, data related to the wearing state of the earphone can be detected by a sensor. As for the sensor and the way of detecting, they have been described previously, so details thereof will not be repeated herein. The sensor may include a tri-axial acceleration sensor. Alternatively, the sensor may further include a temperature sensor, a pressure sensor, etc. In step 702, the sensor outputs data related to the wearing state of the earphone. In step 703, it is determined whether the earphone is in a wearing state according to data from the sensor. For example, data from the sensor may be converted into digital signals. The converted digital signal may be compared to data about specific motion patterns to determine whether the earphone is in a wearing state. In step 704, a control signal indicating whether the earphone is in a wearing state is output according to the determination result in step 703.

Figure 8:
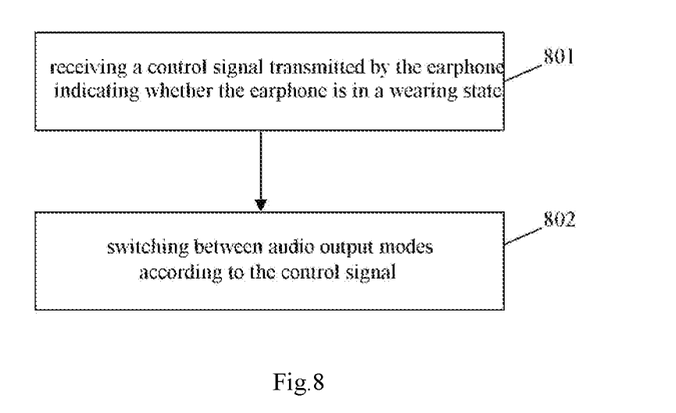
FIG. 8 is a flow chart of a method for switching between output modes of audio signals according to at least one embodiment of the present application.

FIG. 8 is a flow chart of a method for switching between output modes of audio signals according to the present application. As shown in FIG. 8, the method for switching between output modes of audio signals according to the present application comprises: step 801: receiving a control signal transmitted by the earphone indicating whether the earphone is in a wearing state; and step 802: switching between audio output modes according to the control signal.

Specifically, the step of switching between audio output modes according to the control signal may include: determining the current audio output mode to be a first audio output mode in which audio signals are output through the speaker, when the control signal is a control signal indicating the earphone being in a non-wearing state; and determining the current audio output mode to be a second audio output mode in which audio signals are output through the earphone, when the control signal is a control signal indicating the earphone being in a wearing state.

The display device according to the present application comprises the audio output device according to the present application. The display device according to the present application may further comprise an earphone connected to the audio output device in a detachable manner. Specifically, the earphone comprises an earphone according to the present application.

The display device may be any product or component having a display function, such as a cell phone, a tablet computer, a television, a display, a laptop computer, a digital photo frame, a navigator, etc. Alternatively, it may be a display panel for use with, for example, a wearable display device, a medical device, etc. The display device according to the present application especially includes thin display devices. Because the earphone jacks of these thin display devices are becoming smaller and smaller, which makes it more and more difficult to plug the earphones into the earphone jacks of these thin display devices.

Obviously, those skilled in the art can make various modifications and variations to the embodiments of the present application without departing from the spirit and scope of the present application. Therefore, the present application intends to encompass these modifications and variations as long as they fall into the scope defined by the claims of this application or the equivalent technologies.

The invention claimed is:

1. An earphone control circuit, comprising:
a detecting subcircuit for detecting whether an earphone is in a wearing state and outputting a detection signal indicating that the earphone is in a wearing state or in a non-wearing state;
a determining subcircuit for outputting a first control signal indicating that the earphone is in the wearing state or outputting a second control signal indicating that the earphone is in the non-wearing state according to the detection signal, the first control signal and the second control signal being used to control to output an audio signal through the earphone or a speaker; and
a switch subcircuit for turning on and off the earphone control circuit,
when the earphone control circuit is turned on, the determining subcircuit outputs the first control signal indicating that the earphone is in the wearing state or outputs the second control signal indicating that the earphone is in the non-wearing state; and
when the earphone control circuit is turned off, the determining subcircuit always outputs the first control signal indicating that the earphone is in the wearing state.

2. The earphone control circuit according to claim 1, wherein the detecting subcircuit comprises at least one of a tri-axial acceleration sensor, a temperature sensor and a pressure sensor.

3. The earphone control circuit according to claim 1, wherein said determining subcircuit comprises an AD converter for converting the detection signal received from the detecting subcircuit into a digital signal.

4. The earphone control circuit according to claim 3, wherein said determining subcircuit comprises a control signal output subcircuit for outputting a first control signal indicating that the earphone is in a wearing state or outputting a second control signal indicating that the earphone is in a non-wearing state according to the detection signal that has been converted into a digital signal.

5. An earphone, comprising:
an input subcircuit for receiving signals input from the outside;
an output subcircuit for outputting audio signals; and
the earphone control circuit according to claim 1.

6. The earphone according to claim 5, wherein the earphone control circuit is arranged on one of an earphone shell or an earphone wiring.

7. The earphone according to claim 6, wherein
when the earphone control circuit is arranged on the earphone's wirings, the detecting subcircuit comprises a tri-axial acceleration sensor; and
when the earphone control circuit is arranged on the earphone's shells, the detecting subcircuit comprises a pressure sensor or a temperature sensor.

8. The earphone according to claim 7, wherein the input subcircuit is an earphone plug for receiving audio signals from an audio output device and for transmitting, to the audio output device, the first control signal and the second control signal output from the earphone control circuit.

9. The earphone according to claim 8, wherein
the earphone plug is of a five-pole type, wherein a first pole is connected to left channel audio signals, a second pole is connected to right channel audio signals, a third pole is connected to GND signals, a fourth pole outputs the first control signal or the second control signal, and a fifth pole is connected to power signals.

10. The earphone according to claim 5, wherein the earphone is a headset or an earbud.

11. An audio output device with the earphone according to claim 5 mounted thereon, comprising:
a control subcircuit for outputting, according to the first control signal or the second control signal from the earphone, an instruction signal corresponding to the first control signal or the second control signal, to instruct the corresponding earphone or speaker to output audio signals; and
an output subcircuit for outputting audio signals according to the instruction signal.

12. The audio output device according to claim 11, wherein the instruction signal is an audio output mode signal, the audio output mode signal corresponding to the first control signal is outputting audio signals through the earphone, and the audio output mode signal corresponding to the second control signal is outputting audio signals through the speaker.

13. The audio output device according to claim 12, wherein the control subcircuit comprises a switch circuit, for outputting a switching signal instructing to output audio signals through the earphone when the control signal from the earphone indicates the first audio output mode, and for outputting a switching signal instructing to output audio signals through the speaker when the control signal from the earphone indicates the second audio output mode.

14. A display device comprising the audio output device according to claim 11.

15. The display device according to claim 14, further comprising an earphone detachably connected to the audio output device;
wherein the earphone comprises:
an input subcircuit for receiving signals input from the outside;

an output subcircuit for outputting audio signals; and an earphone control circuit, wherein the earphone control circuit comprises a detecting subcircuit for detecting whether an earphone is in a wearing state and outputting a detection signal indicating that the earphone is in a wearing state or in a non-wearing state; and a determining subcircuit for outputting a first control signal indicating that the earphone is in a wearing state or outputting a second control signal indicating that the earphone is in a non-wearing state according to the detection signal.

16. An earphone control method, comprising:

detecting whether an earphone is in a wearing state;

outputting a detection signal indicating that the earphone is in a wearing state or in a non-wearing state;

outputting a first control signal indicating that the earphone is in the wearing state or outputting a second control signal indicating that the earphone is in the non-wearing state according to the detection signal, the first control signal and the second control signal being used to control to output an audio signal through the earphone or a speaker; and turning on and off an earphone control circuit arranged on the earphone, when the earphone control circuit is turned on, the determining subcircuit outputs the first control signal indicating that the earphone is in the wearing state or outputs the second control signal indicating that the earphone is in the non-wearing state; and when the earphone control circuit is turned off, the determining subcircuit always outputs the first control signal indicating that the earphone is in the wearing state.

* * * * *